United States Patent
Hsu et al.

(10) Patent No.: US 11,153,959 B2
(45) Date of Patent: Oct. 19, 2021

(54) APPARATUS AND METHOD FOR GENERATING EXTREME ULTRAVIOLET RADIATION

(71) Applicant: TAIWAN SEMICONDUCTOR MANUFACTURING CO., LTD., Hsinchu (TW)

(72) Inventors: Chun-Chia Hsu, Kaohsiung (TW); Po-Chung Cheng, Chiayi County (TW); Li-Jui Chen, Hsinchu (TW); Shang-Chieh Chien, New Taipei (TW); Yen-Shuo Su, Hsinchu (TW); Chieh Hsieh, Hsinchu (TW); Chi Yang, Taichung (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 146 days.

(21) Appl. No.: 16/535,005

(22) Filed: Aug. 7, 2019

(65) Prior Publication Data

US 2020/0060015 A1     Feb. 20, 2020

Related U.S. Application Data

(60) Provisional application No. 62/719,336, filed on Aug. 17, 2018.

(51) Int. Cl.
*H05G 2/00*     (2006.01)
*G02B 7/182*    (2021.01)

(52) U.S. Cl.
CPC ............ *H05G 2/008* (2013.01); *G02B 7/182* (2013.01)

(58) Field of Classification Search
CPC ............................... H05G 2/008; G02B 7/182
See application file for complete search history.

(56) References Cited

U.S. PATENT DOCUMENTS

| | | | |
|---|---|---|---|
| 8,791,440 B1 * | 7/2014 | Tao | H05G 2/008 250/504 R |
| 8,796,666 B1 | 8/2014 | Huang et al. | |
| 9,093,530 B2 | 7/2015 | Huang et al. | |
| 9,184,054 B1 | 11/2015 | Huang et al. | |
| 9,256,123 B2 | 2/2016 | Shih et al. | |
| 9,529,268 B2 | 12/2016 | Chang et al. | |
| 9,548,303 B2 | 1/2017 | Lee et al. | |
| 9,618,837 B2 | 4/2017 | Lu et al. | |
| 9,869,928 B2 | 1/2018 | Huang et al. | |
| 9,869,934 B2 | 1/2018 | Huang et al. | |

(Continued)

*Primary Examiner* — Blake C Riddick
(74) *Attorney, Agent, or Firm* — McDermott Will & Emery LLP (57) ABSTRACT

An apparatus for generating extreme ultraviolet (EUV) radiation comprises a droplet generator, an excitation laser source, an energy detector, and a feedback controller. The droplet generator is configured to generate target droplets. The excitation laser is configured to generate a pre-pulse and a main pulse to convert the target droplets to plasma by heating. The energy detector is configured to measure a variation in EUV energy generated when the target droplets are converted to plasma. The feedback controller is configured to adjust a time delay between a subsequent pre-pulse and main pulse generated by the excitation laser based on the variation in EUV energy generated by a given main pulse.

20 Claims, 10 Drawing Sheets

(56) References Cited

U.S. PATENT DOCUMENTS

| | | | |
|---|---|---|---|
| 9,869,939 B2 | 1/2018 | Yu et al. | |
| 2008/0179548 A1* | 7/2008 | Bykanov | G03F 7/70033 250/504 R |
| 2012/0248344 A1* | 10/2012 | Wakabayashi | H05G 2/005 250/504 R |
| 2012/0305811 A1* | 12/2012 | Wakabayashi | H05G 2/003 250/504 R |
| 2013/0077073 A1* | 3/2013 | Van Schoot | G03F 7/70033 355/67 |
| 2013/0320244 A1* | 12/2013 | Frihauf | G03F 7/70033 250/504 R |
| 2014/0077099 A1* | 3/2014 | Hori | F21K 2/00 250/458.1 |
| 2014/0084183 A1* | 3/2014 | Wakabayashi | G21K 5/08 250/492.1 |
| 2015/0146182 A1* | 5/2015 | Van Schoot | H05G 2/008 355/67 |
| 2015/0189728 A1* | 7/2015 | Tao | H05G 2/003 250/504 R |
| 2015/0296604 A1* | 10/2015 | Nagai | H05G 2/006 250/504 R |
| 2015/0342016 A1* | 11/2015 | Rafac | H05G 2/005 355/67 |
| 2016/0320708 A1* | 11/2016 | Lu | H05G 2/005 |
| 2017/0171955 A1* | 6/2017 | Ueno | H05H 1/24 |

* cited by examiner

APPARATUS AND METHOD FOR GENERATING EXTREME ULTRAVIOLET RADIATION

RELATED APPLICATIONS

This application claims the priority of U.S. Provisional Application No. 62/719,336 filed on Aug. 17, 2018, the entire contents of which application are incorporated herein by reference.

BACKGROUND

The demand for computational power has increased exponentially. This increase in computational power is met by increasing the functional density, i.e., number of interconnected devices per chip, of semiconductor integrated circuits (ICs). With the increase in functional density, the size of individual devices on the chip has decreased. The decrease in size of components in ICs has been met with advancements in semiconductor manufacturing techniques such as lithography.

For example, the wavelength of radiation used for lithography has decreased from ultraviolet to deep ultraviolet (DUV) and, more recently to extreme ultraviolet (EUV). Further decreases in component size require further improvements in resolution of lithography which are achievable using extreme ultraviolet lithography (EUVL). EUVL employs radiation having a wavelength of about 1-100 nm.

One method for producing EUV radiation is laser-produced plasma (LPP). In an LPP based EUV source a high-power laser beam is focused on small tin droplet targets to form highly ionized plasma that emits EUV radiation with a peak maximum emission at 13.5 nm. The intensity of the EUV radiation produced by LPP depends on the effectiveness with which the high-powered laser can produce the plasma from the droplet targets. Synchronizing the pulses of the high-powered laser with generation and movement of the droplet targets can improve the efficiency of an LPP based EUV radiation source.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus/device may be otherwise oriented (rotated 90 degrees or at other orientations) and the spatially relative descriptors used herein may likewise be interpreted accordingly. In addition, the term "made of" may mean either "comprising" or "consisting of."

The present disclosure is generally related to extreme ultraviolet (EUV) lithography system and methods. More particularly, it is related to apparatuses and methods for controlling an excitation laser used in a laser produced plasma (LPP)-based EUV radiation source. The excitation laser heats metal (e.g., tin) target droplets in the LPP chamber to ionize the droplets to a plasma which emits the EUV radiation. For optimum heating of the target droplets, the target droplets have to arrive at the focal point of the excitation laser at the same time as an excitation pulse from the excitation laser. Thus, synchronization between the target droplets and trigger time for triggering an excitation pulse from the excitation laser contributes to efficiency and stability of the LPP EUV radiation source. One of the objectives of the present disclosure is directed to controlling the excitation laser to provide optimum heating of target droplets.

Figure 1:
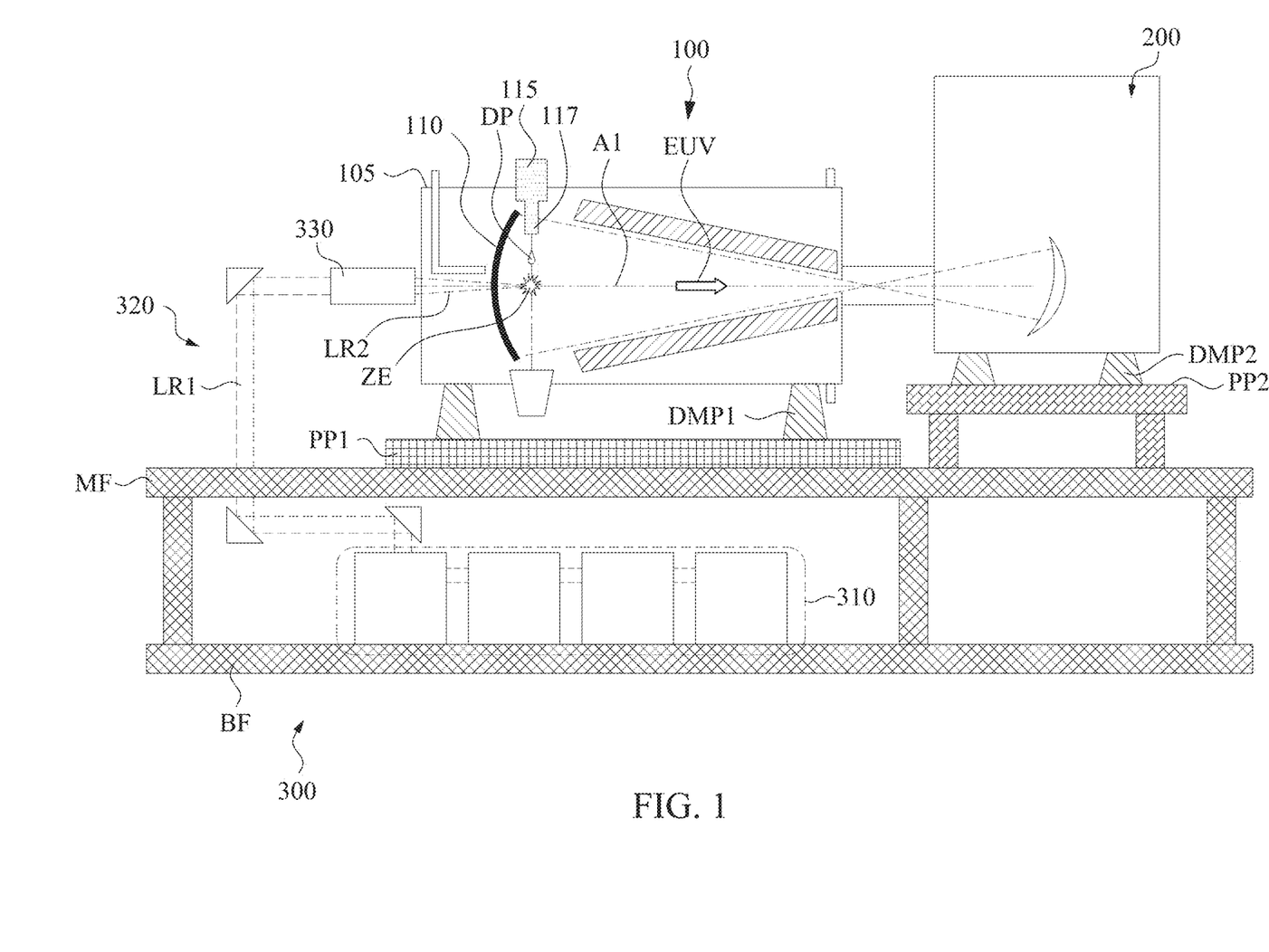
FIG. 1 is a schematic view of an EUV lithography system with a laser produced plasma (LPP) EUV radiation source, constructed in accordance with some embodiments of the present disclosure.

FIG. 1 is a schematic view of an EUV lithography system with a LPP-based EUV radiation source, in accordance with some embodiments of the present disclosure. The EUV lithography system includes an EUV radiation source 100 to generate EUV radiation, an exposure tool 200, such as a scanner, and an excitation laser source 300. As shown in FIG. 1, in some embodiments, the EUV radiation source 100 and the exposure tool 200 are installed on a main floor MF of a clean room, while the excitation laser source 300 is installed in a base floor BF located under the main floor. Each of the EUV radiation source 100 and the exposure tool 200 are placed over pedestal plates PP1 and PP2 via dampers DMP1 and DMP2, respectively. The EUV radiation source 100 and the exposure tool 200 are coupled to each other by a coupling mechanism, which may include a focusing unit.

The lithography system is an extreme ultraviolet (EUV) lithography system designed to expose a resist layer by EUV light (also interchangeably referred to herein as EUV radiation). The resist layer is a material sensitive to the EUV light. The EUV lithography system employs the EUV radiation source 100 to generate EUV light, such as EUV light having a wavelength ranging between about 1 nm and about 100 nm. In one particular example, the EUV radiation source 100 generates an EUV light with a wavelength centered at about 13.5 nm. In the present embodiment, the EUV radiation source 100 utilizes a mechanism of laser-produced plasma (LPP) to generate the EUV radiation.

The exposure tool 200 includes various reflective optical components, such as convex/concave/flat mirrors, a mask holding mechanism including a mask stage, and wafer holding mechanism. The EUV radiation generated by the EUV radiation source 100 is guided by the reflective optical components onto a mask secured on the mask stage. In some embodiments, the mask stage includes an electrostatic chuck (e-chuck) to secure the mask. Because gas molecules absorb EUV light, the lithography system for the EUV lithography patterning is maintained in a vacuum or a-low pressure environment to avoid EUV intensity loss.

In the present disclosure, the terms mask, photomask, and reticle are used interchangeably. In the present embodiment, the mask is a reflective mask. In an embodiment, the mask includes a substrate with a suitable material, such as a low thermal expansion material or fused quartz. In various examples, the material includes $TiO_2$ doped $SiO_2$, or other suitable materials with low thermal expansion. The mask includes multiple reflective layers (ML) deposited on the substrate. The ML includes a plurality of film pairs, such as molybdenum-silicon (Mo/Si) film pairs (e.g., a layer of molybdenum above or below a layer of silicon in each film pair). Alternatively, the ML may include molybdenum-beryllium (Mo/Be) film pairs, or other suitable materials that are configurable to highly reflect the EUV light. The mask may further include a capping layer, such as ruthenium (Ru), disposed on the ML for protection. The mask further includes an absorption layer, such as a tantalum boron nitride (TaBN) layer, deposited over the ML. The absorption layer is patterned to define a layer of an integrated circuit (IC). Alternatively, another reflective layer may be deposited over the ML and is patterned to define a layer of an integrated circuit, thereby forming an EUV phase shift mask.

The exposure tool 200 includes a projection optics module for imaging the pattern of the mask on to a semiconductor substrate with a resist coated thereon secured on a substrate stage of the exposure tool 200. The projection optics module generally includes reflective optics. The EUV radiation (EUV light) directed from the mask, carrying the image of the pattern defined on the mask, is collected by the projection optics module, thereby forming an image on the resist.

In various embodiments of the present disclosure, the semiconductor substrate is a semiconductor wafer, such as a silicon wafer or other type of wafer to be patterned. The semiconductor substrate is coated with a resist layer sensitive to the EUV light in presently disclosed embodiments. Various components including those described above are integrated together and are operable to perform lithography exposing processes.

The lithography system may further include other modules or be integrated with (or be coupled with) other modules.

As shown in FIG. 1, the EUV radiation source 100 includes a target droplet generator 115 and a LPP collector 110, enclosed by a chamber 105. The target droplet generator 115 generates a plurality of target droplets DP, which are supplied into the chamber 105 through a nozzle 117. In some embodiments, the target droplets DP are tin (Sn), lithium (Li), or an alloy of Sn and Li. In some embodiments, the target droplets DP each have a diameter in a range from about 10 microns (μm) to about 100 μm. For example, in an embodiment, the target droplets DP are tin droplets, each having a diameter of about 10 μm, about 25 μm, about 50 μm, or any diameter between these values. In some embodiments, the target droplets DP are supplied through the nozzle 117 at a rate in a range from about 50 droplets per second (i.e., an ejection-frequency of about 50 Hz) to about 50,000 droplets per second (i.e., an ejection-frequency of about 50 kHz). For example, in an embodiment, target droplets DP are supplied at an ejection-frequency of about 50 Hz, about 100 Hz, about 500 Hz, about 1 kHz, about 10 kHz, about 25 kHz, about 50 kHz, or any ejection-frequency between these frequencies. The target droplets DP are ejected through the nozzle 117 and into a zone of excitation ZE at a speed in a range from about 10 meters per second (m/s) to about 100 m/s in various embodiments. For example, in an embodiment, the target droplets DP have a speed of about 10 m/s, about 25 m/s, about 50 m/s, about 75 m/s, about 100 m/s, or at any speed between these speeds.

The excitation laser LR2 generated by the excitation laser source 300 is a pulse laser. The laser pulses LR2 are generated by the excitation laser source 300. The excitation laser source 300 may include a laser generator 310, laser guide optics 320 and a focusing apparatus 330. In some embodiments, the laser source 310 includes a carbon dioxide ($CO_2$) or a neodymium-doped yttrium aluminum garnet (Nd:YAG) laser source with a wavelength in the infrared region of the electromagnetic spectrum. For example, the laser source 310 has a wavelength of 9.4 μm or 10.6 μm, in an embodiment. The laser light LR1 generated by the laser generator 300 is guided by the laser guide optics 320 and focused into the excitation laser LR2 by the focusing apparatus 330, and then introduced into the EUV radiation source 100.

In some embodiments, the excitation laser LR2 includes a pre-heat laser and a main laser. In such embodiments, the pre-heat laser pulse (interchangeably referred to herein as "pre-pulse") is used to heat (or pre-heat) a given target droplet to create a low-density target plume with multiple smaller droplets, which is subsequently heated (or reheated) by a pulse from the main laser, generating increased emission of EUV.

In various embodiments, the pre-heat laser pulses have a spot size about 100 μm or less, and the main laser pulses have a spot size in a range of about 150 μm to about 300 μm. In some embodiments, the pre-heat laser and the main laser pulses have a pulse-duration in the range from about 10 ns to about 50 ns, and a pulse-frequency in the range from about 1 kHz to about 100 kHz. In various embodiments, the pre-heat laser and the main laser have an average power in the range from about 1 kilowatt (kW) to about 50 kW. The pulse-frequency of the excitation laser LR2 is matched with the ejection-frequency of the target droplet DP in an embodiment.

The laser light LR2 is directed through windows (or lenses) into the zone of excitation ZE. The windows adopt a suitable material substantially transparent to the laser beams. The generation of the laser pulses is synchronized with the ejection of the target droplets DP through the nozzle 117. As the target droplets move through the excitation zone, the pre-pulses heat the target droplets and transform them into low-density target plumes. A delay between the pre-pulse and the main pulse is controlled to allow the target plume to form and to expand to an optimal size and geometry. In various embodiments, the pre-pulse and the main pulse have the same pulse-duration and peak power. When the main pulse heats the target plume, a high-temperature plasma is generated. The plasma emits EUV radiation EUV, which is collected by the collector mirror 110. The collector 110 further reflects and focuses the EUV radiation for the lithography exposing processes performed through the exposure tool 200.

Figure 2A:
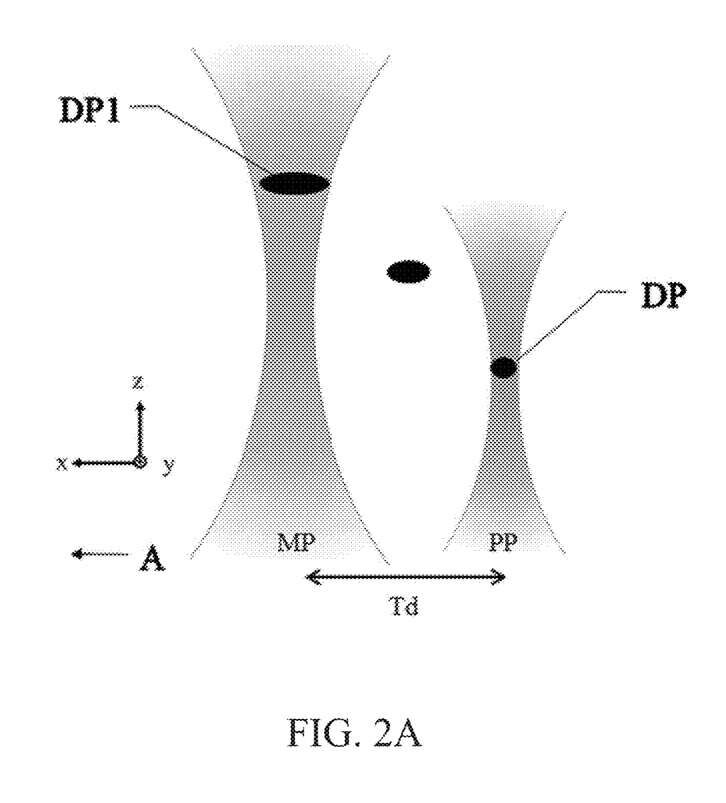
FIGS. 2A, 2B, 2C, 2D, 2E, and 2F schematically illustrate the movement of target droplet by the pre-pulse in X-Z and X-Y planes respectively.

FIG. 2A illustrates the trajectory of the target droplet between the pre-pulse PP and the main pulse MP. As shown in FIG. 2A, a target droplet DP is sequentially irradiated by the pre-pulse PP and the main pulse MP. When the target droplets DP travels along the x-axis in a direction "A" from right to left of FIG. 2A, the target droplet DP is exposed to the pre-pulse PP and the pre-pulse PP heats the target droplet DP causing the target droplet DP to expand, gasify, vaporize, and ionize, and a weak plasma is generated. The following main pulse MP generates a strong plasma and converts the target droplet DP material into a plasma that produces an EUV light emission. There is a time delay Td between the pre-pulse PP and the main-pulse MP. In some embodiments, the time delay Td is in the range from 2500 ns to 3500 ns. In some embodiments, a pre-pulse PP incident upon the target droplet DP has an elliptical cross sectional shape. The elliptical shape of the pre-pulse PP provides an unequal distribution of laser radiation across the surface of the target droplet DP. This unequal distribution provides an unequal temperature and pressure distribution across the target droplet DP which in turn causes the target droplets DP to expand in a non-circular-symmetric manner. As a result of this expansion, the target droplets DP expand to form a generally elliptically shaped target droplet DP1, as shown in FIG. 2A.

The position of the zone of excitation ZE and parameters such as, for example, laser power, time delay between the main pulse and the pre-pulse, focal point of the pre-pulse and/or main pulse, may be determined when an EUV radiation source 100 is set up. The actual position of the zone of excitation ZE and afore-mentioned parameters are then adjusted during wafer exposure using a feedback mechanism in various embodiments. However, these parameters can change over time due to various factors such as, for example, mechanical and/or electrical drift in the radiation source, instability of the droplet generator, and changes in chamber environment.

Figure 2B:
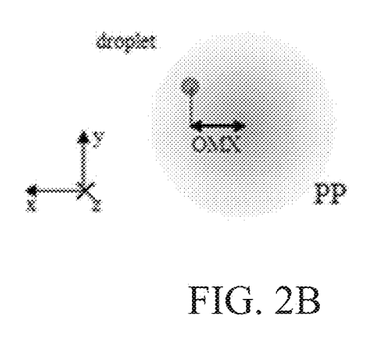
Figure 2C:
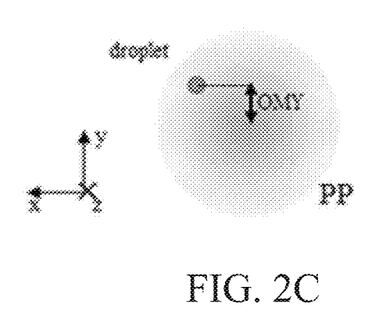
Figure 2D:
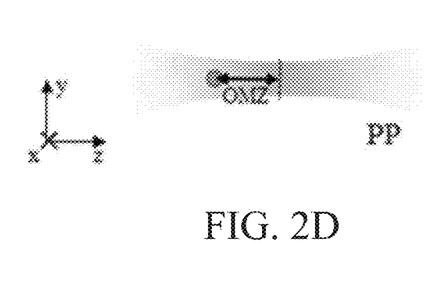
Figure 2E:
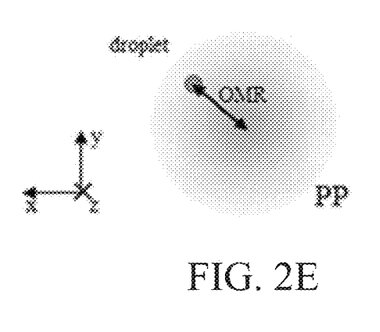

FIG. 2B illustrates an exemplary optical metrology for misalignment in the x-axis OMX. The OMX is defined by a distance in the x-axis between a droplet and the focal point of the pre-pulse PP. Similarly, FIG. 2C illustrates an exemplary optical metrology for misalignment in the y-axis OMY. The OMY is also defined by a distance in the y-axis between the droplet and the focal point of the pre-pulse PP. In some embodiments, the optical metrology for misalignment in Y axis OMY is in a range of −20 μm to 35 μm. FIG. 2D further illustrates an exemplary optical metrology for misalignment in the z-axis OMZ. Similar to OMX and OMY, the OMZ is defined by a distance in the z-axis between a droplet and the focal point of the pre-pulse PP. FIG. 2E illustrates an exemplary optical metrology for misalignment in radius OMR. The x-axis is in the direction of motion by the droplet from the droplet generator 115. The z-axis is along the optical axis A1 of the collector mirror 110. The y-axis is perpendicular to the x-axis and the z-axis.

Figure 2F:
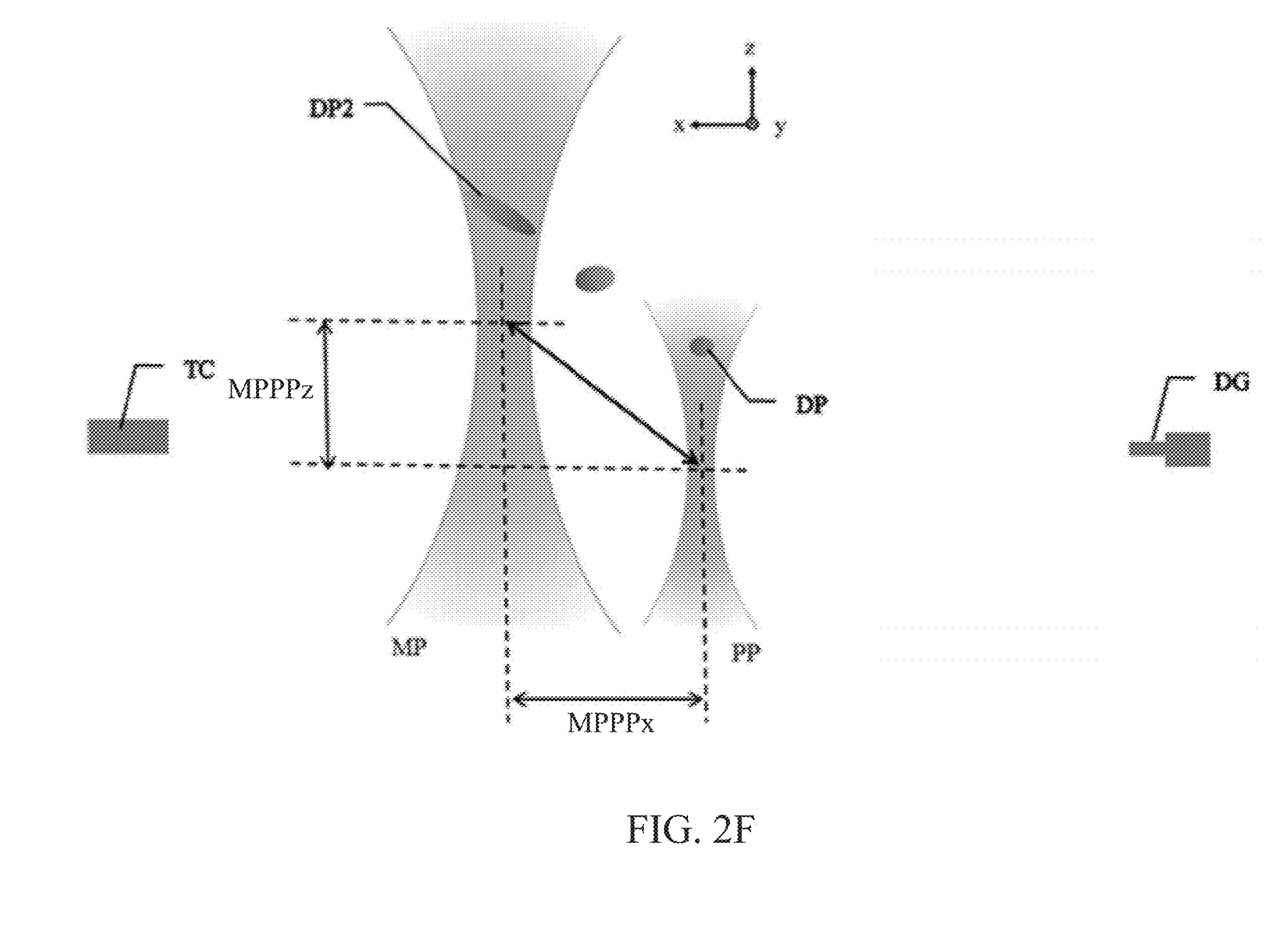

As shown in FIG. 2F, the target droplet DP is ejected from a droplet generator travelling in a direction to a tin catcher TC. When such mechanical and/or electrical drift occurs in the radiation source, the pre-pulse laser PP causes the target droplet DP to expand in a direction with an angle with respect to a direction of incidence from the pre-pulse laser beam. This gives a rise to a target droplet DP2 which has expanded to form a football-like shape shown in FIG. 2C. In such an embodiment, a spatial separation between the pre-pulse PP and the main-pulse MP, MPPP separation, is defined as a distance between the focal point of the pre-pulse PP and the focal point of the main-pulse MP, which is a 3-D vector contributed by x, y, and z sections. For example, as shown in FIG. 2F, MPPPx is a distance along the x-axis of the MPPP separation and MPPPz is a distance along the z-axis of the MPPP separation.

Figure 3A:
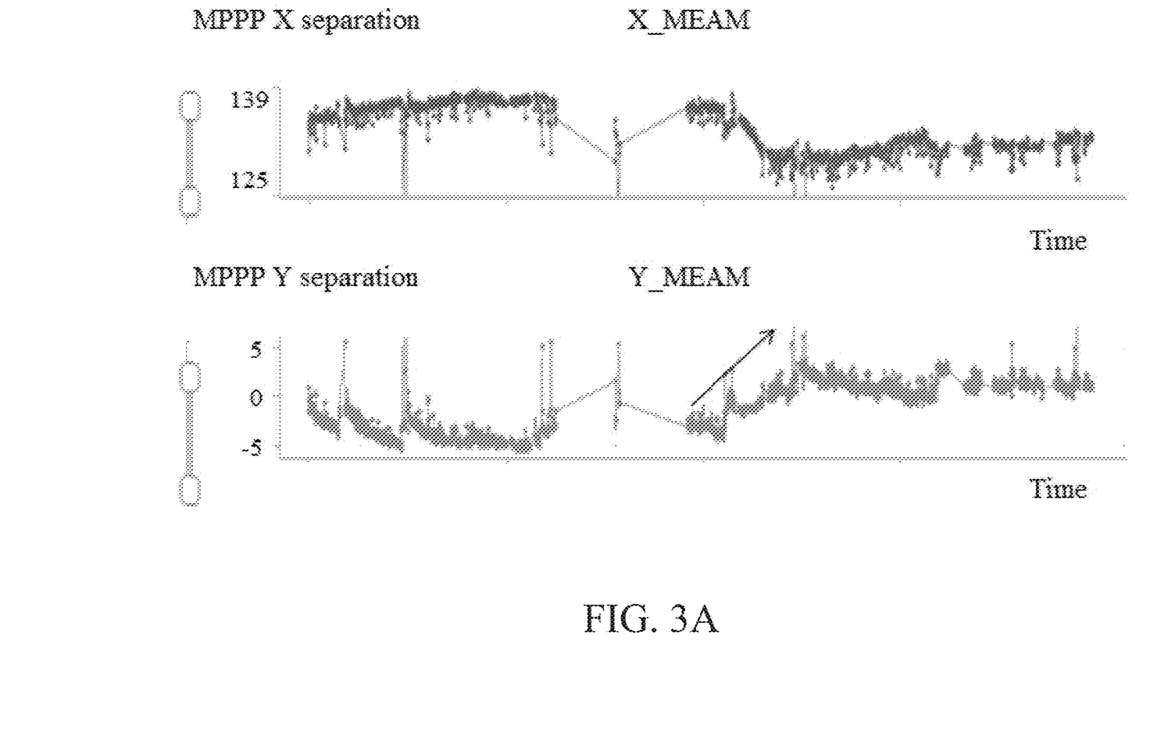
FIG. 3A illustrates the variation in distance between the focal point of the pre-pulse and the focal point of the main pulse hits in X and Y directions caused by beam drift.

FIG. 3A illustrates the variation of the spatial separation between the pre-pulse PP and the main-pulse MP, MPPP separation, in the x-axis and y-axis caused by the mechanical and/or electrical drift in the radiation source. For example, after the target droplets DP are heated by the pre-pulse, the trajectory of travel of the target droplets may be determined by an energy imparted by the pre-pulse PP to the target droplet DP. As such, variation in parameters such as, for example, a position at which the pre-pulse hits the target droplet, energy of the pre-pulse and drift of the focus in the pre-pulse can result in a variation in the trajectory of the target droplet. FIG. 3A illustrates variations of the MPPP separation over the time due to mechanical and/or electrical drift of the EUV radiation source 100. This drift results in a change of the trajectory of the target droplet between the pre-pulse and the main pulse because of the change in amount of energy the target droplet receives from the pre-pulse.

Figure 3B:
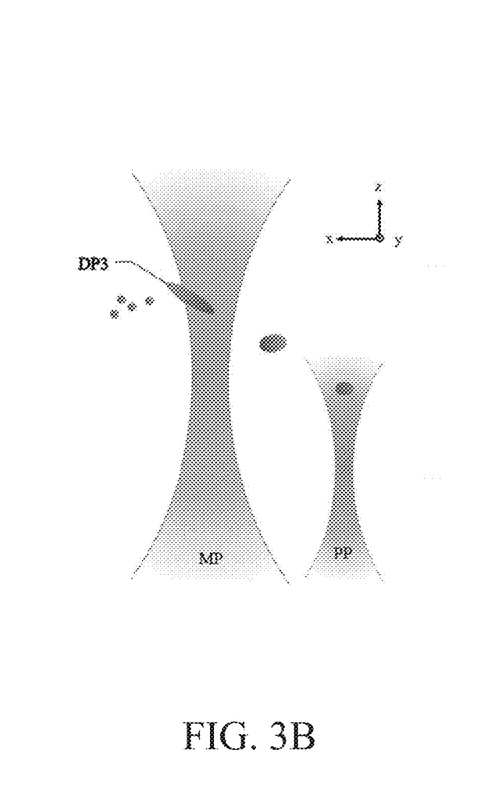
FIGS. 3B and 3C schematically illustrate the effect of variation in distance between the focal point of the pre-pulse and the focal point of the main pulse hits in X and Y directions.
Figure 3C:
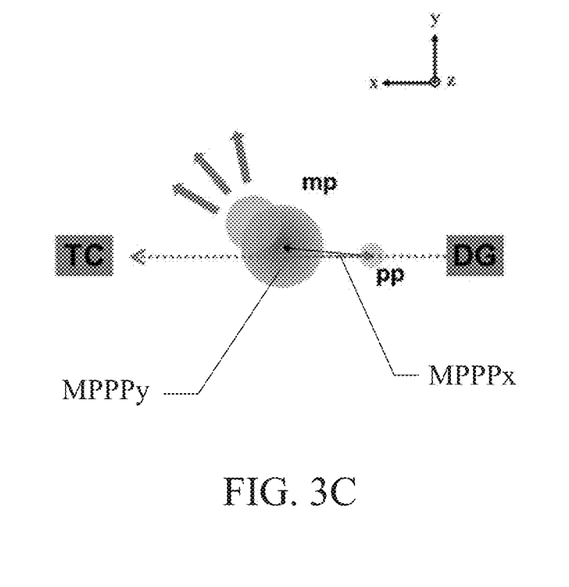

In some instances as shown in FIGS. 3B and 3C, the mechanical and/or electrical drift of the EUV radiation source change the trajectory of the main pulse MP causing the main pulse MP to partially miss the target droplet DP3. As a consequence, some of the under heated tin droplets may be converted to plasma and others may be scattered around the chamber as a debris as shown in FIG. 3B. The debris contaminates various surfaces in the chamber including the collector mirror. Moreover, because the amount of plasma is reduced due to the optical misalignment, the EUV energy generated by the misaligned pulse is also reduced, resulting in a dose error during the lithography exposure.

Figure 4:
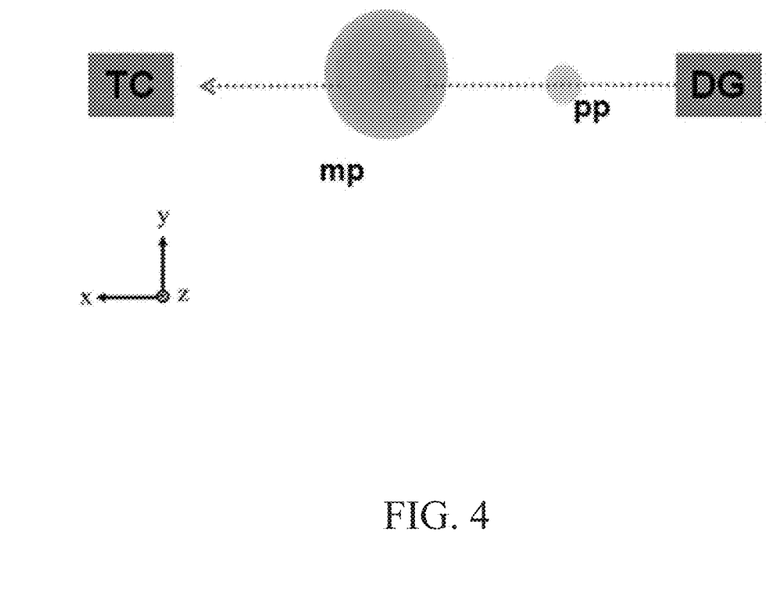
FIG. 4 schematically illustrates the effect of adjusting the distance between the position at which the pre-pulse hits the target droplet and the position at which the main pulse hits the target droplet.

FIG. 4 illustrates a schematic diagram using a feedback mechanism provided in some embodiments. The feedback mechanism changes the time delay between the pre-pulse and the main pulse, thereby adjusting the points where the droplet DP hits the pre-pulse and the main pulse. As discussed elsewhere herein, the change in trajectory of the target droplet results in a change in EUV energy generated from the corresponding main pulse. Thus, the amount of EUV energy produced by a given main pulse can be used to adjust for the drift in focus of the pre-pulse and/or the main pulse.

Figure 5:
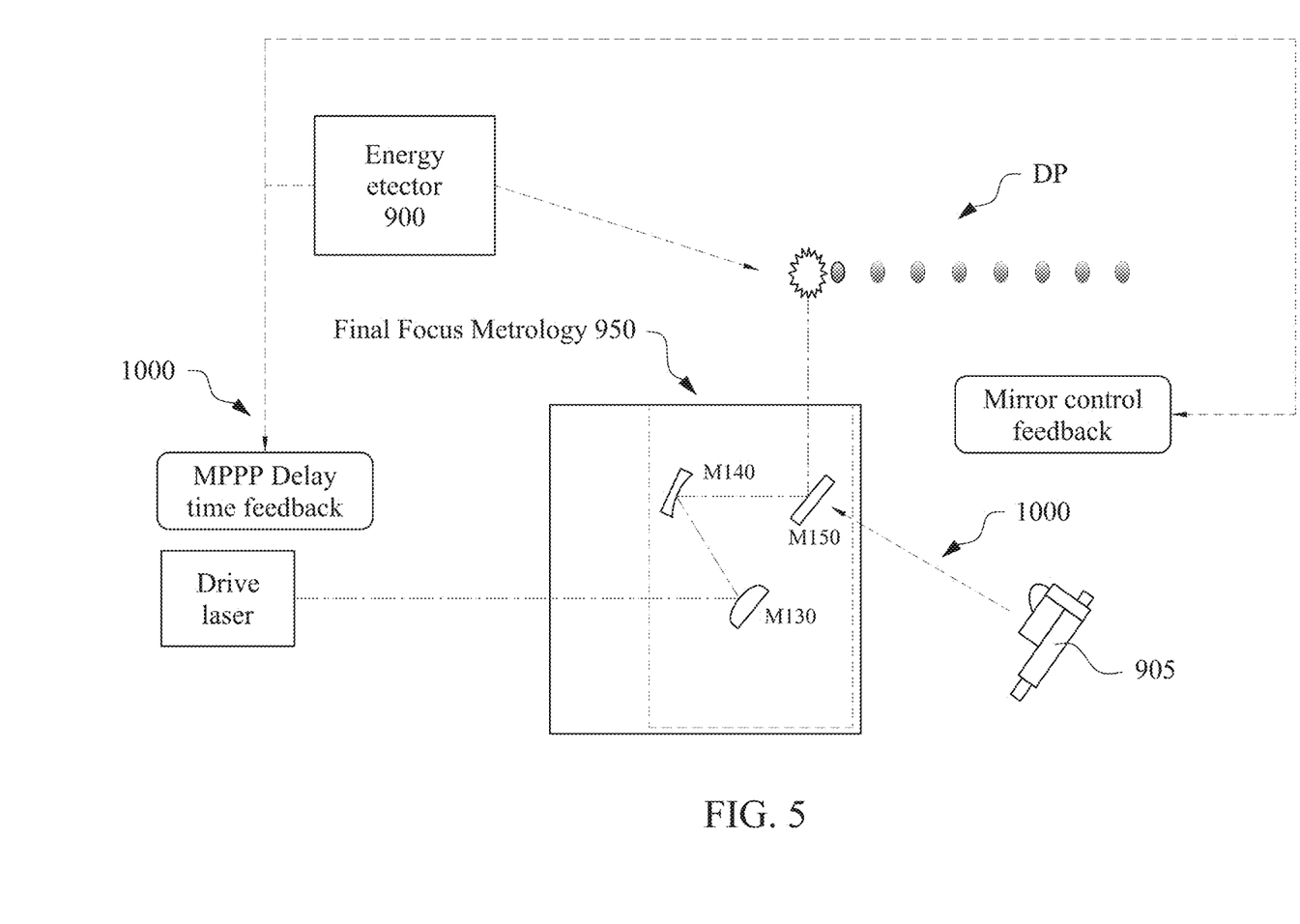
FIG. 5 shows a schematic of the apparatus for generating EUV radiation according to some embodiments of the present disclosure.

FIG. 5 shows an exemplary schematic view of the apparatus for generating EUV radiation according to some embodiments of the present disclosure. In some embodiments, the spatial separation between the pre-pulse PP and the main-pulse MP, MPPP separation, is measured by an energy detector 900. In some embodiments, a variation in EUV energy produced by a main pulse is used as a feedback 1000 for adjusting a time delay between the subsequent pre-pulse and main pulse. In some embodiments, a final focus metrology (FFM) module 950 is provided at the final focus of the pre-pulse and the main-pulse. The FFM module 950 includes a plurality of mirrors, M130, M140, M150, for example, as shown FIG. 5, and measures the variation in EUV generated by the source. The signal from the FFM module 950 is used as a feedback for adjusting the time delay between subsequent pre-pulse and main pulse in some embodiments. In some embodiments, the feedback may be connected with an actuator 905 to control one of the mirrors of the chamber 105, such as for example, the last mirror M150 in the optical path before the laser hits the target droplets.

The feedback mechanism provided in some embodiments may further send a notification based on a subsequent energy measurement information indicating the energy measurement is within the acceptable energy measurement range. In some embodiments, the notification includes a spatial separation between the pre-pulse and the main-pulse. In some embodiments, the notification also includes a time delay between the pre-pulse and the main-pulse. In some embodiments, the notification also includes an angle of a steerable mirror coupled to the radiation source. In some embodiments, based on the generating the notification, the feedback further sends the notification to a first external device associated with a steerable mirror controller and a second external device associated with a time delay controller.

Figure 6:
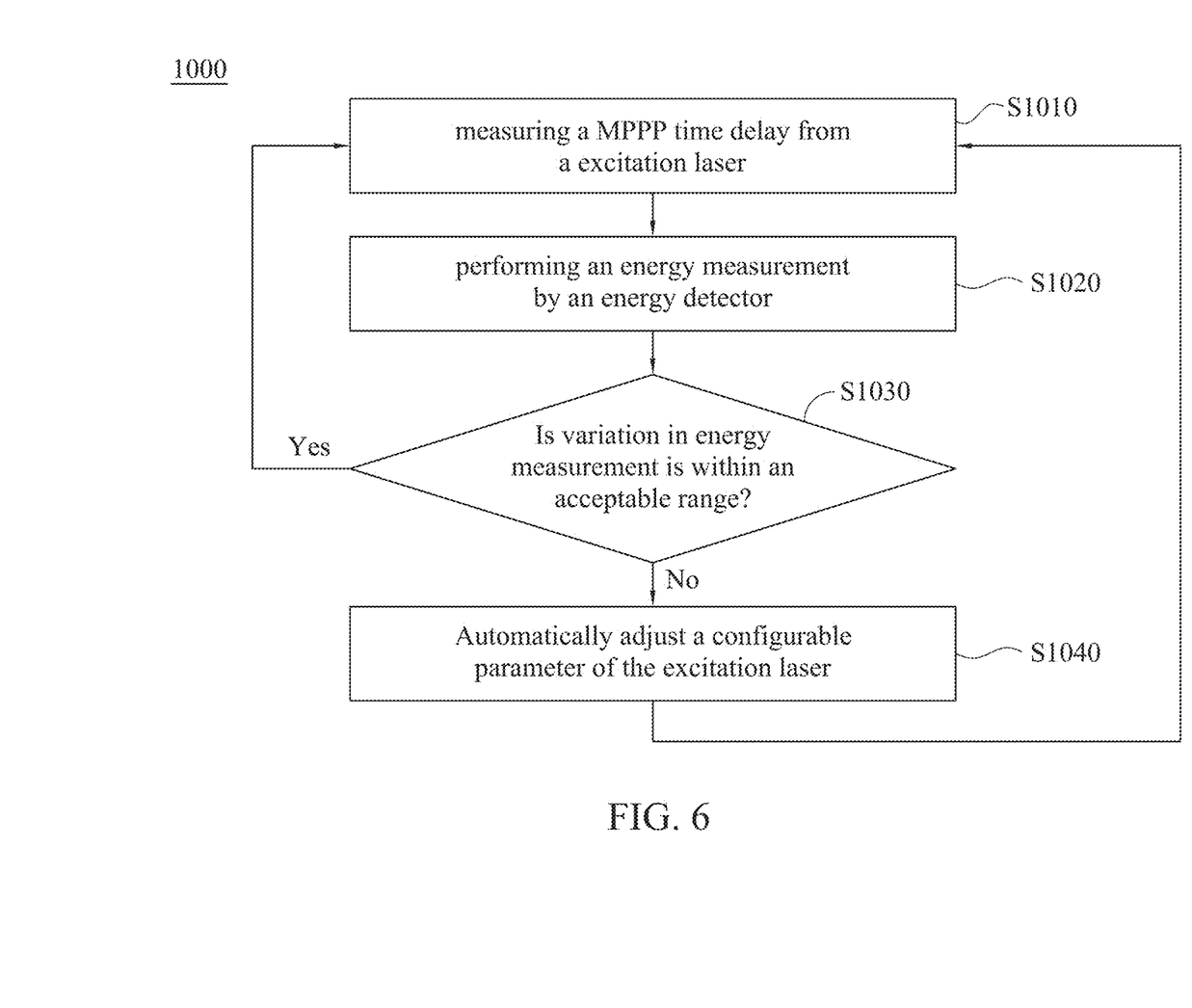
FIG. 6 illustrates a flow-chart of a method of controlling the excitation laser/energy detector system of an EUV source in accordance with an embodiment of the present disclosure.

FIG. 6 illustrates a flow-chart of a method 1000 of controlling the energy detector 900 with the feedback system 1000 of an EUV source, in accordance with an embodiment of the present disclosure. The method includes, at S1010, measuring the time delay between the pre-pulse and the main pulse, MPPP time delay, of the excitation laser. In some embodiments, the MPPP in x-axis MPPPx determined by the energy detector 900 has a separation in the range from about 110 μm to about 220 μm. In some embodiments, the MPPP in y-axis MPPPy determined by the energy detector 900 has a separation in a range from about −25 μm to about 25 μm. The y-axis is perpendicular to the x-axis, an axis along the motion by the droplet, and perpendicular to the z-axis, an axis along the optical axis of the collector mirror 110.

As discussed elsewhere herein, the target droplet reflects and/or scatters a portion of the main-pulse MP incident upon it. At S1020, the reflected and/or scattered light is detected, for example, by the energy detector 900, which is a EUV photodiode.

At S1030, it is determined whether a variation in energy measurement of the detected light (i.e., due to the relative position of the target droplet and the pre-pulse of the laser) is within an acceptable range. In some embodiments, energy measurements measured by the energy detector 900 of the relative position between the target droplet and the pre-pulse of the laser indicate a separation in a range from about −20 μm to about 20 μm. In embodiments where the light is detected using a photodiode, the determination is based on a value of current and/or voltage produced by photodiode when a controller receives the relative position of the target droplet and the pre-pulse of the laser from the photodiode. In some embodiments, the energy detector 900 includes a logic circuit programmed to generate a predetermined signal when the detected variation in energy measurement is not within an acceptable range. For example, a signal is generated when the detected variation in energy measurement is less than a certain threshold value. The threshold value of variation in energy measurement is, for example, an expected minimum variation in energy measurement of the relative position of the laser and the target droplet that can be adequately distinguished from the plasma flash. In some embodiments, the expected minimum variation in energy measurement of the relative position of the laser and the target droplets is determined based an average variation in energy measurement for a largest distance. In some embodiments, the expected minimum variation in energy measurement is, for example, one standard deviation or two standard deviations less than the average variation in energy measurement determined for the largest distance.

If the variation in energy measurement of the detected light is not within the acceptable range, at S1040, a configurable parameter of the excitation laser is automatically adjusted to increase or decrease the variation in energy measurement of the target droplet so as to ultimately bring the variation in energy measurement of the detected light within the acceptable range.

In various embodiments, the configurable parameter of the excitation laser includes, for example, an input voltage and/or current to the light source (e.g., laser) in the excitation laser, a time delay of the excitation laser, and a value of angle and/or tilt of the excitation laser. In some embodiments, the configurable parameter is adjusted using a controller that is programmed to control various configurable parameters of the excitation laser. For example, in an embodiment, the controller is coupled to a time delay controller for controlling the time between the pre-pulse and the main-pulse and/or a mechanism that controls the tilt/angle of the mirror, for example M150 shown in FIG. 5, for the excitation lasers PP and MP. In such embodiments, the controller is coupled to the energy detector 900 and adjusts the length of the time delay and/or the tilt of the mirror M150 for the excitation lasers PP and MP in response to the predetermined signal generated by the energy detector 900 when the variation in energy measurement of the detected light is not within the acceptable range.

In some embodiments, the controller includes a logic circuit programmed to receive a signal from the energy detector 900, and depending on the received signal, transmit control signals to one or more components of the excitation laser to automatically adjust one or more configurable parameters of the excitation laser.

In some embodiments, a mirror controller is also provided to adjust the position of the focus of the pre-pulse and the main pulse based on the signal from the FFM module 950. FIG. 4 schematically illustrates the effect of adjusting the distance between the position at which the pre-pulse hits the target droplet and the position at which the main pulse hits the target droplet.

Figure 7:
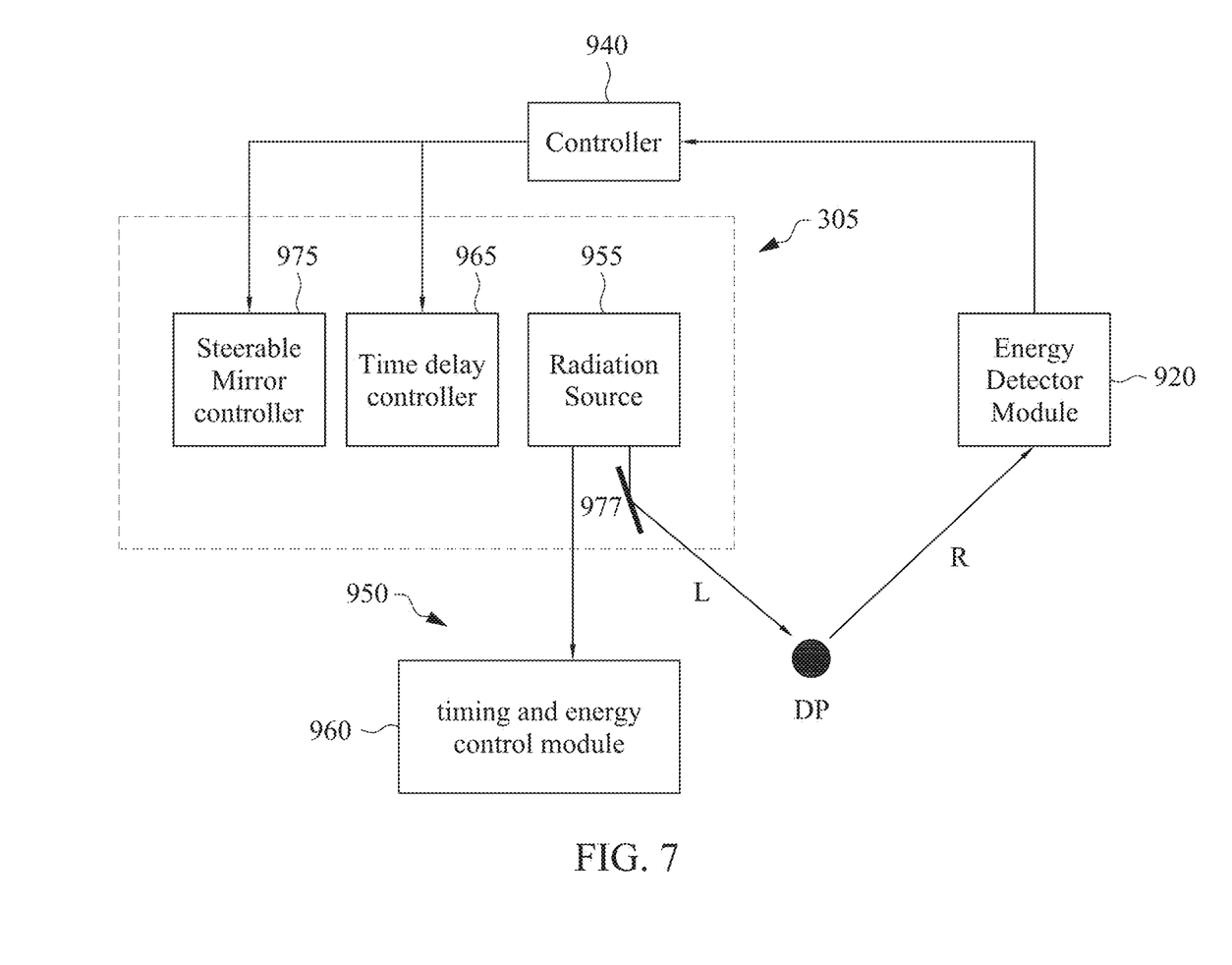
FIG. 7 schematically illustrates an apparatus for measuring a variation in energy measurement of a target droplet, pre-pulse, and the main pulse in an EUV source in accordance with an embodiment of the present disclosure.

FIG. 7 schematically illustrates an apparatus for performing an energy measurement of a target droplet in an EUV source, in accordance with an embodiment of the present disclosure. In an embodiment, the apparatus includes an excitation laser assembly 305, an energy detector module 920, a controller 940 and a processor 950.

In various embodiments, the excitation laser assembly 305 includes a radiation source 955 configured to provide a pre-pulse PP and a main-pulse MP, a time delay controller 965 and a steerable mirror controller 975. The steerable mirror controller 975 controls the tilt angle of a mirror 977. In various embodiments, the steerable mirror controller 975 is an actuator 905 (see FIG. 5) coupled to the mirror of the excitation laser assembly 305 and moves the mirror 977 to change the angle of incidence at which light (or radiation) L is incident on the target droplet DP, thereby changing the amount of light R reflected and/or scattered by the target droplet DP into the energy detector module 920). In some embodiments, the steerable mirror controller 975 includes a piezoelectric actuator 905.

The time delay controller 965 controls the time delay between the pre-pulse PP and the main-pulse MP. For example, when the controller 940 determines that the variation in energy measurement of light detected at energy detector module 920 is lower than the acceptable range such as shown in FIG. 3C, the controller 940 controls the time delay controller 965 such that a shorter time delay is provided between the pre-pulse PP and the main-pulse MP, thereby allowing adequate exposure of the target droplet DP and increasing the detected variation in energy measurement. In such embodiments, one configurable parameter of the excitation laser assembly 305 adjusted by the controller 940 is the time delay in the path of light L exposing the target droplet.

Those of skill in the art will note that while the steerable mirror controller 975 and auto time delay 965 are depicted in the FIG. 7 as being separate from the radiation source 955, the steerable mirror controller 975 and the auto time delay 965 can be integrated with the radiation source 955 to form a single excitation laser assembly 305 in some embodiments. In such embodiments, the coupling between the controller 940 and the excitation laser assembly 305 can be suitably modified to effectuate the same result as disclosed herein.

The controller 940, thus, sets the variation in energy measurement of light detected at the energy detector module 920 to enable a stable exposure of target droplets over a duration of time. A time difference between the exposure of a given target droplet and the detection of peak EUV produced by the immediately preceding target droplet provides, as discussed elsewhere herein, the energy measurement in x and y axis at which the target droplets traverse between the position P and the zone of excitation ZE. An accurate measurement of the reflected or scattered light of the plasma is important for stable production of EUV radiation because it allows synchronization between the arrival of the target droplet and the excitation pulse at the zone of excitation. In an embodiment, a timing and energy control module 960 measures the energy of the reflected or scattered light of the plasma as the controller 940 sets the detected variation in energy measurement.

In the present disclosure, by automatically optimizing the droplet illumination/detection modules, it is possible to improve of energy measurement of target droplets and improve synchronization between excitation pulses and the target droplets. Thus, it is possible to improve the efficiency and stability of an LPP based EUV source.

It will be understood that not all advantages have been necessarily discussed herein, no particular advantage is required for all embodiments or examples, and other embodiments or examples may offer different advantages.

According to one aspect of the present disclosure, an apparatus for generating extreme ultraviolet (EUV) radiation comprises a droplet generator, an excitation laser source, an energy detector, and a feedback controller. The droplet generator is configured to generate target droplets. The excitation laser is configured to generate a pre-pulse and a main pulse to convert the target droplets to plasma by heating. The energy detector is configured to measure a variation in EUV energy generated when the target droplets are converted to plasma. The feedback controller is configured to adjust a time delay between a subsequent pre-pulse and main pulse generated by the excitation laser based on the variation in EUV energy generated by a given main pulse. In some embodiments, the apparatus further comprises an actuator configured to steer the excitation laser to change a focal point of one of or both the pre-pulse and main pulse. In some embodiments, the feedback controller is configured to control the actuator to change the focal point of one of or both the pre-pulse and main pulse based on a variation in EUV energy generated by a preceding main pulse. In some embodiments, the actuator is connected to a steerable mirror. In some embodiments, the excitation laser source is configured to have the time delay in a range from 2500 ns to 3500 ns. In some embodiments, the excitation laser source includes a spatial separation between the pre-pulse and the main-pulse in an x-axis in a range from about 119 μm to about 161 μm. In such embodiment, the x-axis is an axis along a direction of the droplet from the droplet generator. In some embodiments, the excitation laser source includes a spatial separation between the pre-pulse and the main-pulse in an y-axis in a range from about −20 μm to about 20 μm. Operation within the aforementioned ranges improves the accuracy of the excitation laser source irradiating the target droplet. In such embodiment, the y-axis is an axis perpendicular to a direction of the droplet from the droplet generator and parallel with a plane of a collector mirror.

According to another aspect of the present disclosure, a method of controlling a feedback system of an extreme ultraviolet (EUV) radiation source includes measuring a time delay between a pre-pulse and a main pulse from an excitation laser. The method includes performing an energy measurement by an energy detector of a variation in EUV energy generated when the target droplets are converted to plasma. The method also includes determining whether a variation in energy measurement of the detected light is within an acceptable range. In response the variation in energy measurement of the detected light is not within the acceptable range, a configurable parameter of the excitation laser is automatically adjusted to set the variation in energy measurement of the detected light within the acceptable range. In some embodiments, the method further includes generating, by the feedback system, a notification based on a new energy measurement information indicating the energy measurement is within the acceptable energy measurement range. In some embodiments, the notification includes a spatial separation between the pre-pulse and the main-pulse. In some embodiments, the notification also includes a time delay between the pre-pulse and the main-pulse. In some embodiments, the notification also includes an angle of a steerable mirror coupled to the radiation source. In some embodiments, based on the generating the notification, the feedback system further sends the notification to a first external device associated with a steerable mirror controller and a second external device associated with a time delay controller.

According to yet another aspect of the present disclosure, an apparatus for generating extreme ultraviolet (EUV) radiation includes a droplet generator, a final focus module, an energy detector and a controller. The droplet generator is configured to generate target droplets. The final focus module includes a radiation source configured to adjust a time delay between a pre-pulse and a main pulse at a predetermined position, and a steerable mirror. The energy detector is configured to measure a variation in EUV energy generated when the target droplets are converted to plasma. The controller is coupled to the energy detector and programmed to determine whether the variation in energy measurement of radiation by the energy detector is within an acceptable range is within an acceptable range. In response to a determination that the detected variation in energy measurement is not within an acceptable range, the controller is also programmed to automatically adjust, a configurable parameter of the excitation laser. In some embodiments, the apparatus further comprises an actuator that is configured to control a focal point of one of or both the pre-pulse and main pulse. In some embodiments, the controller is configured to control the actuator to change the focal point of one of or both the pre-pulse and main pulse based on a variation in EUV energy generated by a preceding main pulse. In some embodiments, the actuator is configured to control the steerable mirror. In some embodiments, the actuator is a piezoelectric actuator. In some embodiments, the steerable mirror is a last mirror in an optical path before the excitation laser hits the target droplet. In some embodiments, the steerable mirror is adjustable in 3 axis.

It will be understood that not all advantages have been necessarily discussed herein, no particular advantage is required for all embodiments or examples, and other embodiments or examples may offer different advantages.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus for generating extreme ultraviolet (EUV) radiation, the apparatus comprising:
    a droplet generator configured to generate target droplets;
    an excitation laser source configured to generate a pre-pulse and a main pulse to convert the target droplets to plasma by heating;
    an energy detector configured to measure a variation in EUV energy generated when the target droplets are converted to plasma; and
    a feedback controller configured to adjust a time delay between a subsequent pre-pulse and main pulse generated by the excitation laser source based on the variation in EUV energy generated by a given main pulse,
    wherein the feedback controller is configured to adjust a spatial separation between the pre-pulse and the main pulse caused by at least one of a mechanical and an electrical drift of the excitation laser source.

2. The apparatus of claim 1, further comprising an actuator configured to control a focal point of one of or both the pre-pulse and main pulse.

3. The apparatus of claim 2, wherein the feedback controller is configured to control the actuator to change the focal point of one of or both the pre-pulse and main pulse based on a variation in EUV energy generated by a preceding main pulse.

4. The apparatus of claim 2, wherein the actuator is connected to a steerable mirror.

5. The apparatus of claim 2, wherein the excitation laser source is configured to have the time delay in a range from 2500 ns to 3500 ns.

6. The apparatus of claim 1, wherein the excitation laser source includes the spatial separation between the pre-pulse and the main pulse in an x-axis in a range from 119 μm to 161 μm, the x-axis being an axis along a direction of the droplet from the droplet generator.

7. The apparatus of claim 1, wherein the excitation laser source includes the spatial separation between the pre-pulse and the main pulse in a y-axis in a range from −20 μm to 20 μm, the y-axis being an axis perpendicular to a direction of the droplet from the droplet generator and perpendicular to an optical axis of a collector mirror.

8. A method of controlling a feedback system of an extreme ultraviolet (EUV) radiation source, the method comprising:
    measuring a time delay between a pre-pulse and a main pulse from an excitation laser;
    performing an energy measurement by an energy detector of a variation in RN energy generated when target droplets are converted to plasma;
    determining whether a variation in energy measurement is within an acceptable range; and
    in response to a variation in energy measurement that is not within the acceptable range of variation in energy measurement, automatically adjusting a configurable parameter of the excitation laser to set the variation in energy measurement within the acceptable range,
    wherein the feedback system is configured to adjust a spatial separation between the pre-pulse and the main pulse caused by at least one of a mechanical and an electrical drift of the excitation laser.

9. The method according to claim 8, further comprising generating, by the feedback system, a notification based on a new energy measurement information indicating the energy measurement is within the acceptable energy measurement range.

10. The method according to claim 9, wherein the notification includes the spatial separation between the pre-pulse and the main pulse.

11. The method according to claim 9, wherein the notification includes a time delay between the pre-pulse and the main pulse.

12. The method according to claim 9, wherein the notification includes an angle of a steerable mirror coupled to the radiation source.

13. The method of claim 8, further comprising sending, by the feedback system based on the generating a notification, the notification to a first external device associated with a steerable mirror controller and a second external device associated with a time delay controller.

14. An apparatus for generating extreme ultraviolet (EUV) radiation comprising:
    a droplet generator configured to generate target droplets;
    a final focus module comprising:
        a radiation source configured to adjust a time delay between a pre-pulse and a main pulse at a predetermined position, and
        a steerable mirror;
    an energy detector configured to measure a variation in EUV energy generated when the target droplets are converted to plasma by an excitation laser; and
    a controller coupled to the energy detector and programmed to:

determine whether the variation in energy measurement of radiation detected at the energy detector is within an acceptable range, and automatically adjust, in response to a determination that the detected variation in energy measurement is not within an acceptable range, a configurable parameter of the excitation laser, wherein the controller is configured to adjust a spatial separation between the pre-pulse and the main pulse caused by at least one of a mechanical and an electrical drift of the excitation laser.

15. The apparatus of claim 14, further comprising an actuator configured to control a focal point of one of or both the pre-pulse and main pulse.

16. The apparatus of claim 15, wherein the controller is configured to control the actuator to change the focal point of one of or both the pre-pulse and main pulse based on a variation in EUV energy generated by a preceding main pulse.

17. The apparatus of claim 15, wherein the actuator is configured to control the steerable mirror.

18. The apparatus of claim 17, wherein the steerable mirror is a last mirror in an optical path before the excitation laser hits the target droplet.

19. The apparatus of claim 17, wherein the steerable mirror is adjustable in 3 axis.

20. The apparatus of claim 15, wherein the actuator is a piezoelectric actuator.

* * * * *